United States Patent
Li et al.

(10) Patent No.: US 10,922,047 B2
(45) Date of Patent: Feb. 16, 2021

(54) METHOD AND DEVICE FOR CONTROLLING A TERMINAL SPEAKER AND COMPUTER READABLE STORAGE MEDIUM

(71) Applicant: SHENZHEN SKYWORTH-RGB ELECTRONIC CO., LTD., Guangdong (CN)

(72) Inventors: Jian Li, Guangdong (CN); Minghuo Yu, Guangdong (CN); Wensheng Hong, Guangdong (CN); Dechuang Wang, Guangdong (CN); Qiao Wan, Guangdong (CN)

(73) Assignee: SHENZHEN SKYWORTH-RGB ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 16/514,627

(22) Filed: Jul. 17, 2019

(65) Prior Publication Data
US 2020/0310744 A1 Oct. 1, 2020

Related U.S. Application Data

(63) Continuation of application No. PCT/CN2019/092954, filed on Jun. 26, 2019.

(51) Int. Cl.
*G06F 3/16* (2006.01)
*G06K 9/00* (2006.01)
(Continued)

(52) U.S. Cl.
CPC ......... *G06F 3/165* (2013.01); *G06K 9/00718* (2013.01); *G06N 20/00* (2019.01); *H04N 5/60* (2013.01); *H04R 1/323* (2013.01)

(58) Field of Classification Search
None
See application file for complete search history.

(56) References Cited

U.S. PATENT DOCUMENTS 10,681,313 B1 * 6/2020 Day ............... H04N 7/181
2015/0003648 A1 1/2015 Kang
(Continued)

FOREIGN PATENT DOCUMENTS

CN 103295610 A 9/2013
CN 104036789 A 9/2014
(Continued)

OTHER PUBLICATIONS

Chinese Intellectual Property Office, Office Action for Application No. 201910230077.0, 8 total pages.
(Continued)

*Primary Examiner* — Paul W Huber
(74) *Attorney, Agent, or Firm* — SoCal IP Law Group LLP; Mark Andrew Goldstein

(57) ABSTRACT

Disclosed are a method and a device for controlling a terminal speaker, and a computer readable storage medium. A display screen of a terminal is divided into at least two displaying areas, each displaying area corresponding to at least one speaker, and the method includes: detecting whether a video to be displayed is processed by an artificial intelligence learning, after the video to be displayed sent by a server is received; if yes, acquiring a frame identification code in the video to be displayed; if a frame currently displayed by the terminal is a target frame corresponding to the frame identification code, determining position information of a target sound source according to the frame identification code corresponding to the target frame; and controlling the at least one speaker in the displaying area
(Continued)

corresponding to the position information of the target sound source to output a sound corresponding to the target frame.

15 Claims, 5 Drawing Sheets

(51) Int. Cl.
  *G06N 20/00* (2019.01)
  *H04R 1/32* (2006.01)
  *H04N 5/60* (2006.01)

(56) References Cited

U.S. PATENT DOCUMENTS

2018/0109900 A1* 4/2018 Lyren .................. H04S 7/304
2019/0035431 A1* 1/2019 Attorre ................ G10L 17/00

FOREIGN PATENT DOCUMENTS

| | | |
|---|---|---|
| CN | 104618796 A | 5/2015 |
| CN | 108141674 A | 6/2018 |
| CN | 108806560 A | 11/2018 |
| CN | 109194796 A | 1/2019 |
| CN | 109194999 A | 1/2019 |
| CN | 109302664 A | 2/2019 |
| CN | 109862293 A | 6/2019 |
| JP | S62155879 A | 7/1987 |
| JP | 2013236136 A | 11/2013 |
| WO | 2020191934 A1 | 10/2020 |

OTHER PUBLICATIONS

Chinese Intellectual Property Office, International Search Report and Written Opinion for International Application No. PCT/CN2019/092954, dated Dec. 6, 2019, total of 4 pages.

Chinese Intellectual Property Office, Office Action for Application No. 201910230077.0, dated Aug. 3, 2020, 18 total pages.

* cited by examiner

METHOD AND DEVICE FOR CONTROLLING A TERMINAL SPEAKER AND COMPUTER READABLE STORAGE MEDIUM

CROSS-REFERENCE TO RELATED APPLICATIONS

The present disclosure is a Continuation Application of PCT Application with No. PCT/CN2019/092954, filed on Jun. 26, 2019, which claims the priority of Chinese Patent Application with No. 201910230077.0, entitled "METHOD AND DEVICE FOR CONTROLLING A TERMINAL SPEAKER, AND COMPUTER READABLE STORAGE MEDIUM", filed on Mar. 25, 2019, which is hereby incorporated by reference in its entirety.

TECHNICAL FIELD

The present disclosure relates to the technical field of terminal, in particular to a method and a device for controlling a terminal speaker, and a computer readable storage medium.

BACKGROUND

Crystal sound television comes into our lives with science and technology boom and motivates the user's live experience. The present televisions, however, still include two speakers respectively located at the left and the right sides. The sound is controlled by balancing the left and right channels, and the position of the sound output from the television cannot be changed with respect to the sound sources of the displayed frames. For example, as the positions of the speakers are fixed, the position of human voice output by the television cannot change with the positions of the person displayed on the screens.

SUMMARY

It is therefore one main objective of the disclosure to provide a method and a device for controlling a terminal speaker, and a computer readable storage medium, aiming to solve the technical problem that the position of the sound output by the current terminal cannot be changed with the sound sources of the displayed frames.

In order to achieve the above objective, the present disclosure provides a method for controlling a terminal speaker, a display screen of a terminal is divided into at least two displaying areas, each displaying area corresponding to at least one speaker, and the method includes the following operations:

detecting whether a video to be displayed is processed by an artificial intelligence learning, after the video to be displayed sent by a server is received;

if yes, acquiring a frame identification code in the video to be displayed;

if a frame currently displayed by the terminal is a target frame corresponding to the frame identification code, determining position information of a target sound source according to the frame identification code corresponding to the target frame; and controlling the at least one speaker in the displaying area corresponding to the position information of the target sound source to output a sound corresponding to the target frame.

In addition, in order to realize the above objective, the present disclosure further provides a device for controlling a terminal speaker, the device includes a memory, a processor, and a program for controlling the terminal speaker stored on the memory and executable on the processor, the program when executed by the processor performs the operations of the method for controlling the terminal speaker as described above.

In addition, in order to realize the above objective, the present disclosure further provides a computer readable storage medium, the computer readable storage medium stores a program for controlling a terminal speaker, and the program when executed by a processor performs the operations of the method for controlling the terminal speaker as described above.

In the present disclosure, the terminal can acquire the frame identification code in the video to be displayed when the video to be displayed which is processed by the artificial intelligence learning is received; if the frame currently displayed by the terminal is the target frame corresponding to the frame identification code, the position information of the target sound source can be determined according to the frame identification code corresponding to the target frame, and the speaker in the displaying area corresponding to the position information of the target sound source can be controlled to output the sound corresponding to the target frame. Therefore, the position of the sound output by the terminal can be changed with respect to the changes of the sound sources of the displayed frames.

The realization of the aim, functional characteristics, and advantages of the present disclosure are further described specifically with reference to the accompanying drawings and embodiments.

DETAILED DESCRIPTION OF THE EMBODIMENTS

It should be understood that the specific embodiments described herein are merely illustrative of the present disclosure and are not intended to limit the present disclosure.

Figure 1:
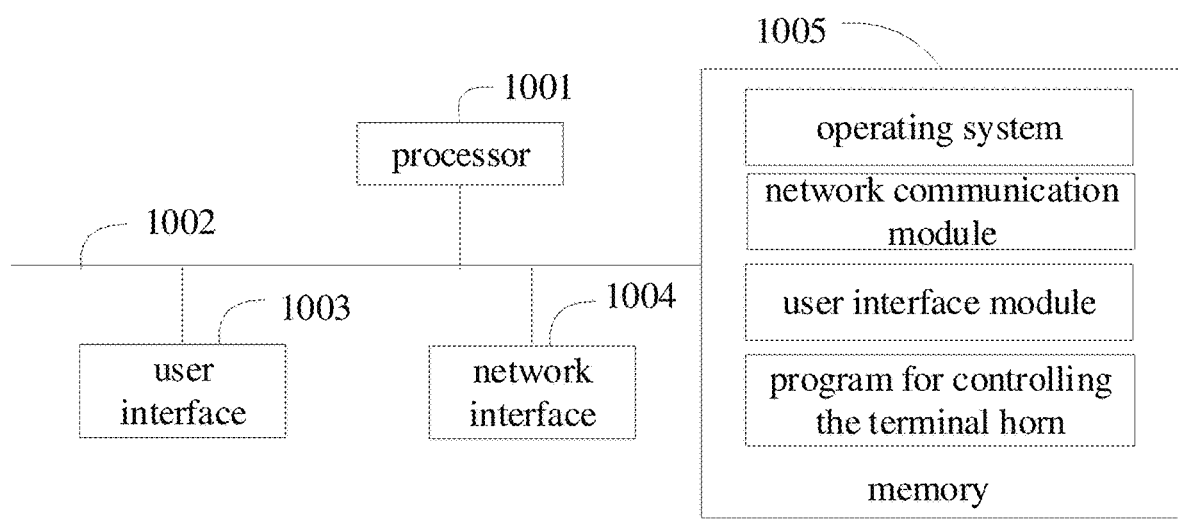
FIG. 1 is a schematic structural diagram of a hardware operating environment according to an exemplary embodiment of the present disclosure.

Referring to FIG. 1, FIG. 1 is a schematic structural diagram of a hardware operating environment according to an exemplary embodiment of the present disclosure.

It should be noted that FIG. 1 can be a schematic structural diagram of the hardware operating environment of a control device of the terminal torn. In the exemplary embodiment of the present disclosure, the device for controlling the terminal speaker can be a terminal device such as a PC or a portable computer.

As shown in FIG. 1, the device for controlling the terminal speaker may include a processor 1001, such as a CPU, a user interface 1003, a network interface 1004, a memory 1005, and a communication bus 1002. The communication bus 1002 is configured for implementing connection communication among these components. The user interface 1003 can include a display, an input unit such as a keyboard. Optionally, the user interface 1003 can also include a standard wired interface, and a wireless interface. The network interface 1004 can optionally include a standard wired interface, and a wireless interface (such as a WI-FI interface). The memory 1005 may be a high speed Random Access Memory (RAM) or a non-volatile memory such as a disk memory. The memory 1005 can also optionally be a storage device independent of the aforementioned processor 1001.

It can be understood by those skilled in the art that the structure of the device for controlling the terminal speaker as shown in FIG. 1 does not constitute a limitation of the device for controlling the terminal speaker, and the device for controlling the terminal speaker may include more or less components than those illustrated, a combination of certain components, or a combination of certain components, or components different from those illustrated.

As shown in FIG. 1, the memory 1005 regarded as a computer storage medium may include an operating system, a network communication module, a user interface module, and a program for controlling the terminal speaker. The operating system is configured to manage and control the program of the terminal speaker for controlling hardware and software resources, and also configured to support the operations of the program for controlling the terminal speaker, and other software or programs.

In the device for controlling the terminal speaker as shown in FIG. 1, the user interface 1003 is mainly configured to connect with a server and perform a data communication with the server. The network interface 1004 is mainly configured to connect to a background server and perform a data communication with the background server. It can be understood that the device for controlling the terminal speaker can be a terminal where the speaker is located. The display screen of the terminal is divided into at least two displaying areas, each displaying area corresponds to at least one speaker. The processor 1001 can be configured to call the program for controlling the terminal speaker stored on the memory 1005, and perform the following operations:

detecting whether a video to be displayed is processed by an artificial intelligence learning, after the video to be displayed sent by a server is received;

if yes, acquiring a frame identification code in the video to be displayed;

if a frame currently displayed by the terminal is a target frame corresponding to the frame identification code, determining position information of a target sound source according to the frame identification code corresponding to the target frame; and controlling the at least one speaker in the displaying area corresponding to the position information of the target sound source to output a sound corresponding to the target frame.

Furthermore, the operation of controlling the at least one speaker in the displaying area corresponding to the position information of the target sound source to output the sound corresponding to the target frame, includes:

if it is detected that the position information of the target sound source corresponds to two displaying areas, determining that the position information of target sound source corresponds to a previously appeared displaying area and a subsequently appeared displaying area; and controlling the speaker corresponding to the previously appeared displaying area to output the sound corresponding to the target frame with a decreasing voice volume, and controlling the speaker corresponding to the subsequently appeared displaying area to output the sound corresponding to the target frame with an increasing voice volume.

Furthermore, after the operation of if it is detected that the position information of the target sound source corresponds to two displaying areas, determining that the position information of target sound source corresponds to the previously appeared displaying area and the subsequently appeared displaying area, the processor 1001 can further call the program for controlling the blockchain-based terminal speaker stored on the memory 1005, and perform the following operations:

controlling the speaker corresponding to the previously appeared displaying area to output the sound corresponding to the target frame with a first volume, and controlling the speaker corresponding to the subsequently appeared displaying area to output the sound corresponding to the target frame with a second volume, and the first volume is lower than the second volume.

Furthermore, the operation of acquiring the frame identification code in the video to be displayed, if it is detected that the video to be displayed is processed by the artificial intelligence learning, includes:

if yes, acquiring the frame identification code from a header file of the video to be displayed.

Furthermore, after the operation of detecting whether the video to be displayed is processed by the artificial intelligence learning, after the video to be displayed sent by the server is received, the processor 1001 can further call the program for controlling the blockchain-based terminal speaker stored on the memory 1005, and perform the following operations:

if not, adopting a preset artificial intelligence learning algorithm to identify the position information of a sound source corresponding to a sound frame in the video to be displayed; and adding frame identification codes to the sound frame, associating and writing each of the frame identification codes and corresponding position information of the sound source into the video to be displayed, for obtaining the video to be displayed as processed by the artificial intelligence learning.

Furthermore, the operation of associating and writing each of the frame identification codes and corresponding position information of the sound source into the video to be displayed, for obtaining the video to be displayed that is by the artificial intelligence learning, includes:

encoding each of the frame identification codes and corresponding position information of sound source as a character string according to a preset coding rule; and adding an ending tag to an end of the character string, and writing the character string carrying the ending tag into the header file of the video to be displayed for obtaining the video to be displayed as processed by the artificial intelligence learning.

Furthermore, after the operation of detecting whether the video to be displayed is processed by the artificial intelligence learning, after the video to be displayed sent by the server is received, the processor 1001 can further call the program for controlling the blockchain-based terminal speaker stored on the memory 1005, and perform the following operations:

if not, determining an activated speaker in the terminal; and controlling the activated speaker to output the sound in the video to be displayed.

Furthermore, the operation of detecting whether the video to be displayed is processed by the artificial intelligence learning, after the video to be displayed sent by the server is received, includes:

detecting whether a feature code of the artificial intelligence learning exists in the video to be displayed, after the video to be displayed sent by the server is received; and if the feature code exists in the video to be displayed, determining the video to be displayed is processed by the artificial intelligence learning.

The embodiments of the device for controlling the terminal speaker of the present disclosure are substantially the same as the embodiments of the method for controlling the terminal speaker and thus not described herein.

Based on the structures as described above, the methods for controlling the terminal speaker according to the embodiments of present disclosure are provided.

Figure 2:
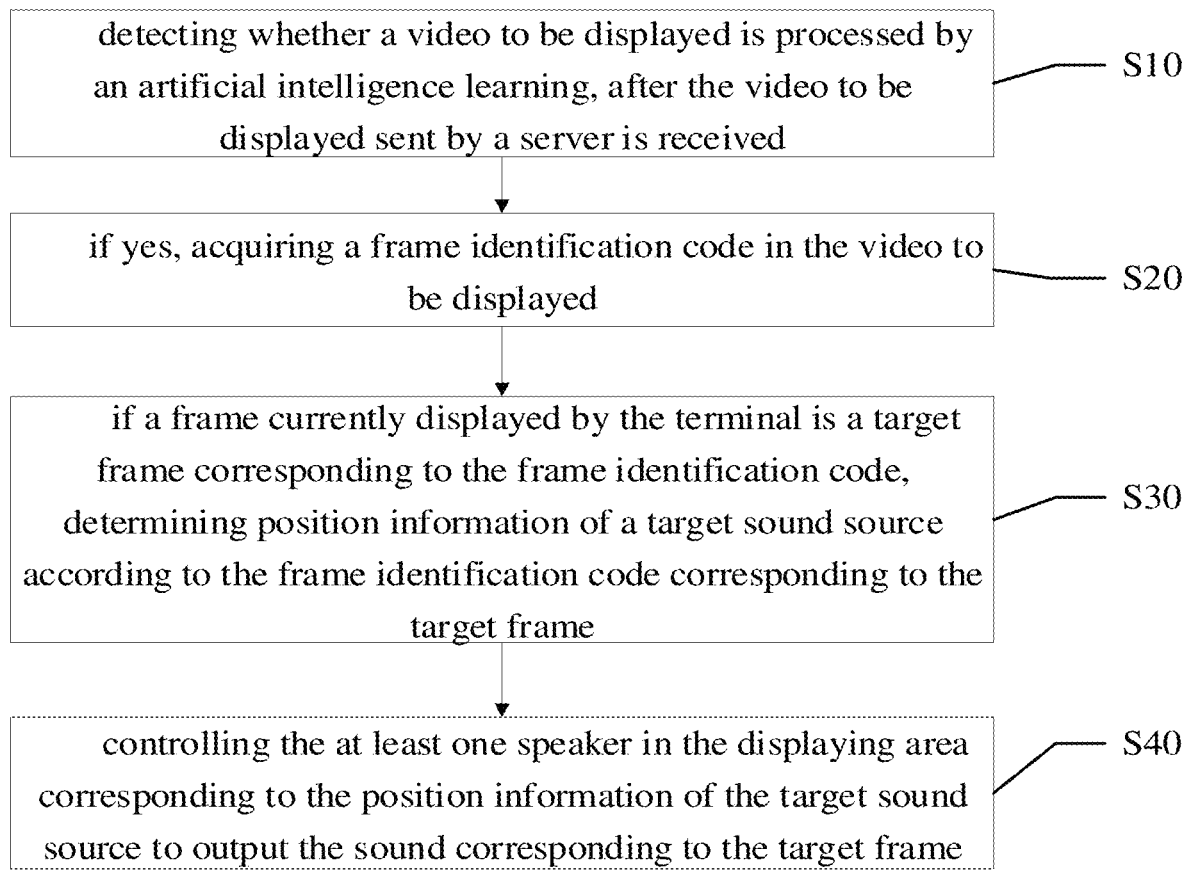
FIG. 2 is a flow chart of a method for controlling a terminal speaker according to a first exemplary embodiment of the present disclosure.

Referring to FIG. 2, FIG. 2 is the flow chart of the method for controlling terminal speaker according to a first exemplary embodiment of the present disclosure.

The methods for controlling the terminal speaker according to embodiments of the present disclosure are provided. It should be noted that although the logical sequence is shown in the flow chart, in some cases, the operations of method may be performed in a different sequence.

The method for controlling a terminal speaker includes:

S10, detecting whether a video to be displayed is processed by an artificial intelligence learning, after the video to be displayed sent by a server is received.

In the embodiment of the present disclosure, the terminal can be, but is not limited to, a device having a video playing function, such as a television and a personal computer. The display screen of the terminal is divided into at least two displaying areas, and each displaying area corresponds to at least one speaker. After the terminal receives the video to be displayed sent by the server, the terminal detects whether the video to be displayed is processed by an Artificial Intelligence (AI) learning. Specifically, the server may negotiate with the terminal in advance, about on which videos to be displayed the artificial intelligence learning is performed. For example, the server may negotiate with the terminal to determine that which videos to be processed should be subjected to the artificial intelligence learning. For example, the server may negotiate with the terminal to determine that the video to be displayed with a display duration longer than a preset display duration can be subjected to the artificial intelligence learning, or determine that the video to be displayed with a specific type can be subjected to the artificial intelligence learning, such as the TV video or music video. As such, after the terminal receives the video to be displayed sent by the server, the terminal only needs to detect the display duration of the video to be processed, or determine the type of the video to be processed, for determining whether the video to be processed has been processed by the artificial intelligence learning.

It should be noted that if the video to be displayed has been subjected to the artificial intelligence learning, the video contains the position information of sound source and corresponding frame identification code. That is, for the video processed by the artificial intelligence learning, the terminal can determine which frames are sound frames, and their relative positions of the sound sources in the sound frames. The frame identification code is configured to indicate there exists the sound frame, and the position information of sound source is configured to indicate the relative position of the sound source in the corresponding sound frame.

Furthermore, S10 includes:

step a, detecting whether a feature code of the artificial intelligence learning exists in the video to be displayed, after the video to be displayed sent by the server is received; and step b, if the feature code exists in the video to be displayed, determining the video to be displayed is processed by the artificial intelligence learning.

Further, the server may perform the artificial intelligence learning to the video to be displayed according to the specific situation. After the server performs the artificial intelligence learning on one video to be displayed, the server adds a feature code to the video to be displayed, for informing the terminal that the video to be displayed has been subjected to artificial intelligence learning. In the embodiment of the present disclosure, the representation form of the feature code is not limited, which may be represented as a number, a letter, or a combination of the two.

After the terminal receives the video to be displayed sent by the server, the terminal detects whether the feature code of the artificial intelligence learning exists in the video to be displayed. If it is detected that the feature code exists in the video to be displayed, the terminal determines that the video to be displayed is processed by the artificial intelligence learning; if it detects that the feature code does not exist in the video to be displayed, the terminal determines that the video to be displayed is not processed by the artificial intelligence learning. In order to improve the efficiency of the terminal detecting whether the video to be displayed is processed by the artificial intelligence learning, the server can write the feature code in the header file of the video to be displayed. It can be understood that the server can alternatively write the feature code at the end of the video to be displayed. This embodiment does not specifically limit the position of the feature code in the video to be displayed.

S20, if yes, acquiring a frame identification code in the video to be displayed.

If the terminal detects that the video to be displayed is processed by the artificial intelligence learning, the terminal acquires the frame identification code in the video to be displayed. The frame having the sound in the video to be displayed can be determined according to the frame identification code. Specifically, the server may set the frame identification code only for the frame having the sound. At this point, each frame identification code has corresponding position information of sound source. If the server sets the frame identification code for each frame of the video to be displayed, only the frame identification code corresponding to the frame having the sound would have the corresponding position information of sound source, and the frame identification code corresponding to the frame without the sound does not have the corresponding position information of sound source. For convenience of description, the frame identification code corresponding to the frame having the sound is taken as an example in the following contents. In the embodiment of the present disclosure, the representation form of the frame identification code is not specifically limited. The frame identification code can be configured to recognize that which frame of the video to be displayed has sound.

Furthermore, S20 includes:

step c, acquiring the frame identification code from a header file of the video to be displayed.

Further, in order to improve the efficiency of the terminal acquiring the frame identification code, after the server recognizes the frame having the sound in the video to be displayed through the artificial intelligence learning, the server sets corresponding frame identification code for the frame having the sound, and writes the identification code into the header file of the video to be displayed. Therefore, when the terminal detects that the video to be displayed is processed by the artificial intelligence learning, the terminal acquires the frame identification code in the header file of the video to be displayed. Further, the server may also write the frame identification code and the feature code into the header file of the audio file corresponding to the video to be displayed.

S30, if a frame currently displayed by the terminal is a target frame corresponding to the frame identification code, determining position information of a target sound source according to the frame identification code corresponding to the target frame.

In the process of the terminal displaying the video to be displayed, the terminal detects whether the currently displayed frame is a frame corresponding to the frame identification code. In the embodiment of the present disclosure, the currently displayed frame corresponding to the frame identification code is recorded as the target frame. If the terminal detects that the currently displayed frame is the target frame, the terminal determines the position information of sound source according to the frame identification code corresponding to the target frame, and records the position information of sound source corresponding to the frame identification code of the target frame as the position information of target sound source. It should be noted that the size of one frame in the embodiment of the present disclosure may be set according to specific needs. Specifically, the position information of sound source can be represented by coordinates. As such, referring to FIG. 3, the original point can be set at a lower left corner of the display screen of the terminal, the positive direction of the horizontal axis (namely, x axis) extends from the original point to the right, and the positive direction of the vertical axis (namely, y axis) extends upwards from the original point. It should be noted that the original point can be set at a center of the display screen of the terminal. The embodiment does not limit the establishment form of the coordinates.

Further, if the terminal detects that the currently displayed frame is not the target frame, the terminal continues to display the video to be displayed, and continues to detect whether the currently displayed frame is the target frame. It can be understood that, during the process of the terminal displaying the video to be displayed, the terminal can perform the image processing and audio processing on the video to be displayed, for normally displaying the video to be displayed.

S40, controlling the at least one speaker in the displaying area corresponding to the position information of the target sound source to output the sound corresponding to the target frame.

After the terminal determines the position information of target sound source according to the frame identification code corresponding to the target frame, the terminal controls the speaker in the displaying area corresponding to the position information of a target sound source to output the sound corresponding to the target frame. The position information of target sound source may correspond to one coordinate or several coordinates. Therefore, the position information of target sound source may correspond to one or more displaying areas. It can be understood that, if the frame contains the sound source uttered by human, whether someone makes a sound is determined by intelligently learning the changes in mouth shape during the artificial intelligence learning process. And if a person makes the sound, the position information of the sound source should correspond to the position of his mouth. As such, the position information of target sound source may correspond to a plurality of coordinates, which means that the position information of target sound source corresponds to a coordinate group.

Figure 3:
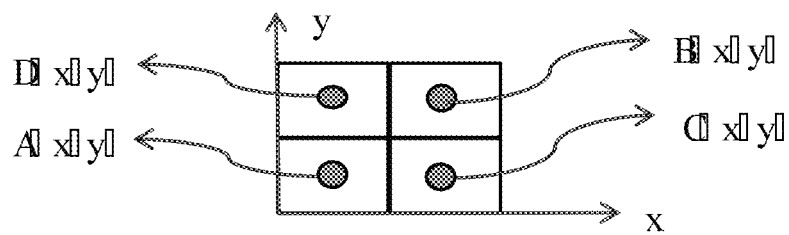
FIG. 3 is a schematic diagram of a display screen coordinates of a terminal according to an exemplary embodiment of the present disclosure.

Specifically, referring to FIG. 3, the display screen of the terminal is divided into four displaying areas with equal size, namely displaying area A, displaying area B, displaying area C, and displaying area D. Each displaying area is provided with one speaker. If the resolution of the display screen is 3840×2160, the coordinate system can be established according to the pixels, and the coordinate points corresponding to the sounds are represented by the pixels. As such, the resolutions of the four displaying areas are all 1920×1080. If the centers of the four displaying area are provided with one speaker, the coordinates of the four speakers are defined as a, b, c and d, respectively. And the coordinate of a is (960, 540), the coordinate of b is (2880, 1620), the coordinate of c is (2880, 540), and the coordinate of d is (960, 1620). When the terminal detects that the position information of target sound source has the coordinate of (960, 540), the terminal controls the speaker at the displaying area A to output the sound of the video to be displayed. When the terminal detects that the position information of target sound source has the coordinate of (2000, 900), the terminal controls the speaker at the displaying area C to output the sound of the video to be displayed. When the terminal detects that the position information of target sound source has the coordinates of (1910, 1000) and (1925, 995), the terminal controls the speaker at A displaying area and the speaker at the displaying area C together to output the sound of the video to be displayed.

In the embodiment, when the terminal receives the video to be displayed after being processed by the artificial intelligence learning, the terminal obtains the frame identification code in the video to be displayed. If the currently displayed frame is the target frame corresponding to the frame identification code, the position information of target sound source is determined according to the frame identification code corresponding to the target frame image, and the speaker at the displaying area corresponding to the position information of the target sound source is controlled to output the sound corresponding to the target frame. Therefore, the position of sound output by the terminal can change with the positions of the sound sources in the displayed screens, improving user's live experience when the video is displayed.

Furthermore, the method for controlling the terminal speaker according to a second embodiment of the present disclosure is provided.

The difference between the method for controlling the terminal speaker according to the second embodiment and the method for controlling the terminal speaker according to the first embodiment includes that step S40 includes:

step d, if it is detected that the position information of the target sound source corresponds to two displaying areas, determining that the position information of target sound source corresponds to a previously appeared displaying area and a subsequently appeared displaying area.

In the process of the terminal controls the speaker at the displaying area corresponding to the position information of target sound source to output the sound corresponding to the target frame, the terminal may detect whether the position information of target sound source corresponds to the two displaying areas. If it is detected that the position information of target sound source corresponds to two displaying areas, the terminal acquires the previously appeared displaying area and the subsequently appeared displaying area which are both associated with the target frame. It should be noted that the terminal may acquire the previous frame and the subsequent frame relative to the target frame, the terminal may also acquire a previous two frame and the one subsequent frame relative to the target frame, or the terminal may acquire a first three frame and a last three frame relative to the target frame, etc. Specifically, the terminal determines whether the position information of target sound source corresponds to two displaying areas by the coordinate in the position information of the target sound source.

When the terminal acquires the previous frame and the subsequent frame which are both associated with the target frame, the terminal can determine that the position information of target sound source corresponds to the previously appeared displaying area and the subsequently appeared displaying area in the two displaying areas according to the previous and subsequent frames. The previously appeared displaying area appears first in the frame, and the subsequently appeared displaying area appears later in the frame, that is, the object that emits sound moves from the previously appeared displaying area to the subsequently appeared displaying area.

Figure 4:
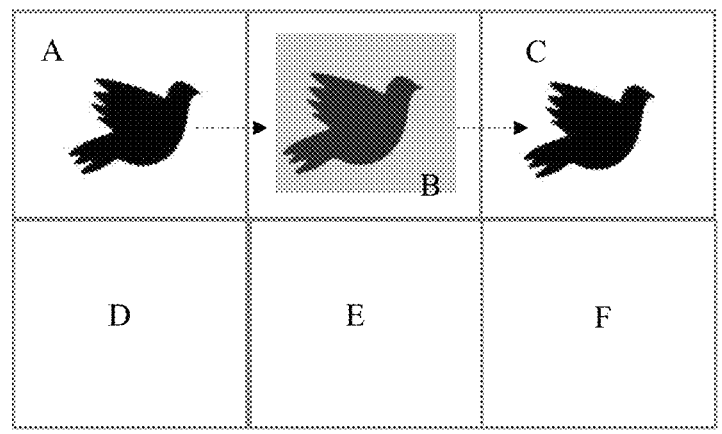
FIG. 4 is a schematic diagram of the terminal controlling position information of a target sound source to correspond to sound output by a speaker corresponding to the target frame screen in the displaying area according to an embodiment of the present disclosure.

Further, if the terminal detects that the position of the target sound source corresponds to one displaying area, the terminal controls the speaker at the displaying area to output the sound of the target frame. Specifically, referring to FIG. 4, the display screen of the terminal is divided into six displaying areas, namely displaying areas A, B, C, D, E, and F, respectively. If the bird in the video to be displayed chirps all through its flying, when the bird flies in the displaying area A, the terminal controls the speaker corresponding to the displaying area A to output the bird's chirp. When the bird flies to the displaying area B, the terminal controls the speaker corresponding to B displays the area to output the bird's chirp. When the bird flies to the displaying area C, the terminal controls the speaker corresponding to C displays the area to output the bird's chirp.

Step e, controlling the speaker corresponding to the previously appeared displaying area to output the sound corresponding to the target frame with a decreasing voice volume, and controlling the speaker corresponding to the subsequently appeared displaying area to output the sound corresponding to the target frame with an increasing voice volume.

After the terminal determines that the position information of target sound source corresponds to the previously appeared displaying area and the subsequently appeared displaying area of the two displaying areas, the terminal controls the speaker corresponding to the previously appeared displaying area to output the sound corresponding to the target frame with the decreasing voice volume, and controls the speaker corresponding to the subsequently appeared displaying area to output the sound corresponding to the target frame with the increasing voice volume.

Furthermore, the method for controlling the terminal speaker further includes:

step f, controlling the speaker corresponding to the previously appeared displaying area to output the sound corresponding to the target frame with a first volume, and controlling the speaker corresponding to the subsequently appeared displaying area to output the sound corresponding to the target frame with a second volume, and the first volume is lower than the second volume.

Further, after the terminal determines the previously appeared displaying area and the subsequently appeared displaying area, the terminal controls the speaker corresponding to previously appeared displaying area to output the sound corresponding to the target frame with the first volume, and controls the speaker corresponding to subsequently appeared displaying area to output the sound corresponding to the target frame with the second volume, and the first volume is lower than the second volume. The first volume and the second volume may be set according to specific needs, which are not specifically limited in the embodiment.

Further, when the terminal detects that the position information of target sound source corresponds to two displaying areas, the terminal can determine that the areas of sounding object corresponding to the sound source in the two displaying areas. The displaying area having the sounding object with a larger area is recorded as the first displaying area, and the displaying area having the sounding object with a smaller area is recorded as the second displaying area. The speaker corresponding to the first displaying area is controlled to output sound of the frame with the third volume, and the speaker corresponding to the second displaying area is controlled to output sound of the frame with the fourth volume, and the third volume is greater than the fourth volume. In the embodiment, the third volume and the fourth volume are not specifically limited. The sounding object can be a mouth of person, a mouth of an animal, a musical instrument, or the like. It can be understood that the terminal can also control the speakers at the two displaying areas to output sounds of the frames with the same volume.

It should be noted that when the terminal detects that the position information of target sound source corresponds to three or four displaying areas, the rule for controlling speaker corresponding to three or four displaying areas is similar to the rule for controlling speaker corresponding to two displaying areas, and is omitted herein.

In the embodiment, when it is detected that the position information of the target sound source corresponds to two displaying areas, it is determined that the position information of the target sound source corresponds to the previously appeared displaying area and the subsequently appeared displaying area in the two displaying areas. The speaker corresponding to the previously appeared displaying area is controlled to output the sound corresponding to the target frame with the decreasing voice volume, and the speaker corresponding to the subsequently appeared displaying area is controlled to output the sound corresponding to the target frame with the increasing voice volume. Or the speaker corresponding to the first displaying area with the larger area is controlled to output the sound corresponding to the frame with the third volume, the speaker corresponding to the second displaying area with the smaller area is controlled to output the sound corresponding to the frame with the fourth volume, and the third volume is greater than the fourth volume. Therefore, the accuracy is improved in respect to the positions of sound output by the terminal changing with the sound sources in the displayed frame, further improving the intelligence of the sound output by the terminal.

Furthermore, the method for controlling the terminal speaker according to a third embodiment of the present disclosure is provided.

Figure 5:
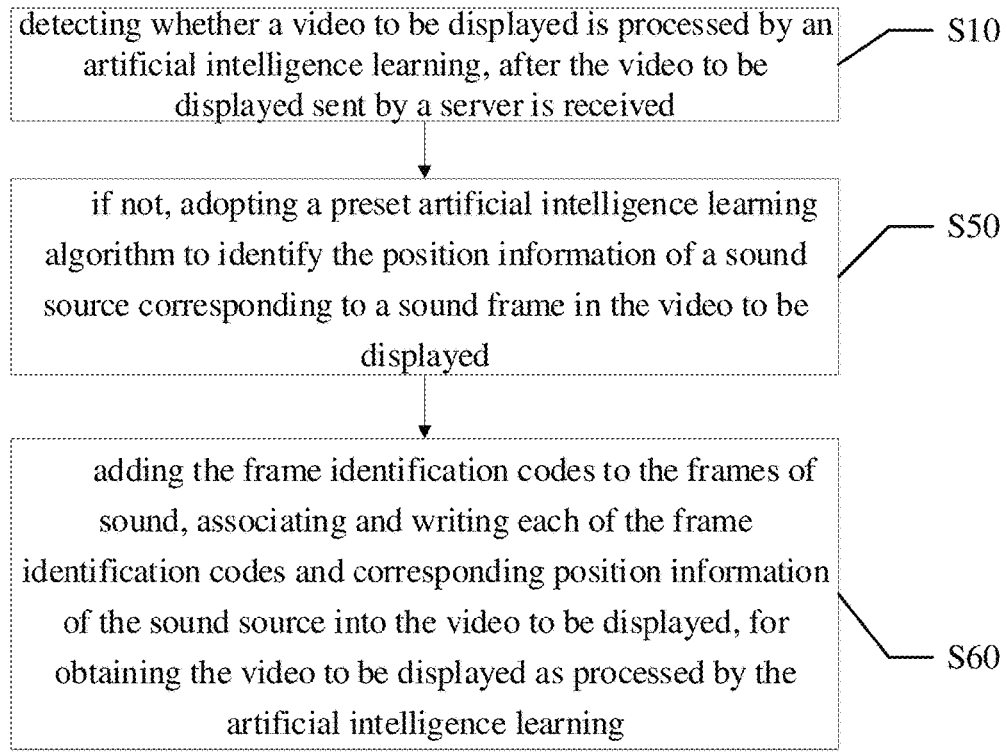
FIG. 5 is a flow chart of a method for controlling a terminal speaker according to a further exemplary embodiment of the present disclosure.

The difference between the method for controlling the terminal speaker according to the third embodiment and the method for controlling the terminal speaker according to the first or second embodiment includes that, as shown in FIG. 5, the method according to the third embodiment further includes:

S50, if not, adopting a preset artificial intelligence learning algorithm to identify the position information of a sound source corresponding to a sound frame in the video to be displayed.

When the terminal detects that the video to be displayed is not processed by the artificial intelligence learning, the terminal adopts the preset artificial intelligence learning algorithm to identify the position information of the sound source corresponding to the sound frame in the video to be displayed. The artificial intelligence learning algorithm include, but is not limited to, a machine learning algorithm and a deep learning algorithm. The machine learning algorithm includes, but is not limited to, a Support Vector Machine (SVM), a Naive Bayesian (NB), a k-NearestNeighbor (KNN) classification algorithm, a Decision Tree (DT), and a Random Forest (RF), and a Gradient Boosting Decision Tree (GDBT). The deep learning algorithm includes, but is not limited to, a Convolutional Neural Network (CNN), recurrent neural networks, and recursive neural networks. It can be understood that whether the person or animal has generated sound can be determined according to the lip position of the person or the animal, so that the changing position of the mouth shape is marked with coordinate, then the coordinate is input into the artificial intelligence learning algorithm for training the artificial intelligence learning algorithm, to obtain the trained artificial intelligence learning algorithm. Therefore, the position information of the sound source corresponding to the sound frame in the video to be displayed can be organized after the video to be displayed is input into the trained artificial intelligence learning algorithm.

S60, adding the frame identification codes to the frames of sound, associating and writing each of the frame identification codes and corresponding position information of the sound source into the video to be displayed, for obtaining the video to be displayed as processed by the artificial intelligence learning.

The terminal adds the frame identification code to the sound frame in the video to be displayed, and each frame identification code and the corresponding position information of sound source are associated and written into the video to be displayed, for obtaining the video to be displayed as processed by the artificial intelligence learning.

It should be noted that the process of the server performing the artificial intelligence learning on the video to be displayed is consistent with the process of the terminal performing the artificial intelligence learning on the video to be displayed. Therefore, in the embodiment of the present disclosure, there is no need to describe the process of the server performing the artificial intelligence learning on the video to be displayed in detail.

In the embodiment, when the terminal detects that the video to be displayed is not processed by the artificial intelligence learning, the terminal adopts the preset artificial intelligence learning algorithm to identify the position information of sound source corresponding to the sound frame in the video to be displayed, then adds the frame identification code to the sound frame, and associates and writes each frame identification code and the corresponding position information of sound source into the video to be displayed, for obtaining the video to be displayed after being processed by the artificial intelligence learning. Therefore, the reliability has been improved of the positions of sound changing with the sound sources in the displayed frame.

Figure 6:
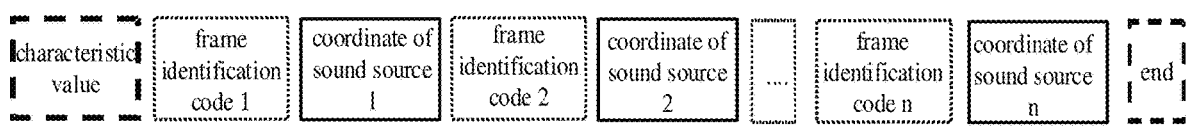
FIG. 6 is a schematic diagram of frame identification codes, position information of sound source, and feature codes which cooperatively correspond to a character string according to an exemplary embodiment of the present disclosure.

Furthermore, the operation of associating and writing each of the frame identification codes and corresponding position information of the sound source into the video to be displayed, for obtaining the video to be displayed as processed by the artificial intelligence learning, includes:

step h, encoding each of the frame identification codes and corresponding position information of sound source as a character string according to a preset coding rule; and Further, after the terminal adds the frame identification code to the sound frame, the terminal encodes each frame identification code and the corresponding position information of sound source into the header file of the video to be displayed according to a preset coding rule. The coding rule can be adopted to combine the frame identification codes and the corresponding position information of sound source into one character string. In the character string, the frame identification codes and the corresponding position information of sound source can be coded according to a formula of "frame identification code 1—coordinate of sound source 1—frame identification code 2—coordinate of sound source 2—frame identification code n—coordinate of sound source n". Specifically, as shown in FIG. 6, the position information of sound source may also be written in front of the frame identification code. Further, the frame identification codes and the corresponding position information of sound source can be coded into a table according to the coding rule.

step i, adding an ending tag to an end of the character string, and writing the character string carrying the ending tag into the header file of the video to be displayed for obtaining the video to be displayed as processed by the artificial intelligence learning.

After the character string is obtained, the terminal can add the ending tag at the end of the character string, and then write the character string carrying the ending tag into the header file of the video to be displayed for obtaining the video to be displayed as processed by artificial intelligence learning. In this embodiment, the ending tag may be represented by a specific character. For example, the ending tag may be represented by "end", as shown in FIG. 6. Further, as shown in FIG. 6, the server can write the feature code at the first place of the character string. It should be noted that if the terminal itself performs the artificial intelligence learning on the video to be displayed, there is no need to add the feature code into the character string.

Figure 7:
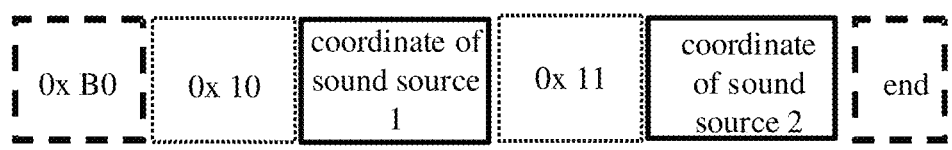
FIG. 7 is another schematic diagram of frame identification codes, position information of sound source, and feature codes which cooperatively correspond to a character string according to an exemplary embodiment of the present disclosure.

Specifically, as shown in FIG. 7, the two frames of 0x10 and 0x11 are taken as examples. The feature code of 0xB0 represents that the video to be displayed is processed by the artificial intelligence learning, the frame identification code of 0x10 represents that sound exists in the frame corresponding to 0x10, and the position information of sound source corresponding to 0x10 is regarded as the coordinate of sound source 1. The frame identification code of 0x11 represents that sound exists in the frame, and the position information of sound source corresponding to 0x10 is regarded as the coordinate of sound source 2. That is, when the frame with the mark of 0x10 is displayed, the coordinate of sound source 1 is acquired, and the speaker at the displaying area corresponding to the coordinate of sound source 1 is controlled to output sound. When the frame with the mark of 0x11 is displayed, the coordinate of sound source 2 is acquired, and the speaker at the displaying area corresponding to the coordinate of sound source 2 is controlled to output sound.

In the embodiment, the terminal is notified that the content displayed before the ending tag is not related to the video to be displayed and the content displayed after the ending tag is related to the video to be displayed by adding the ending tag at the end of the character string, so as to avoid the feature code, the frame identification code, the position information of sound source, and the related content of the video to be displayed from being confused when the terminal decodes the video to be displayed, for preventing the phenomenon of failing to display video to be displayed from and improving the success rate of displaying the video to be displayed.

Furthermore, the method for controlling the terminal speaker according to a fourth embodiment of the present disclosure is provided.

Figure 8:
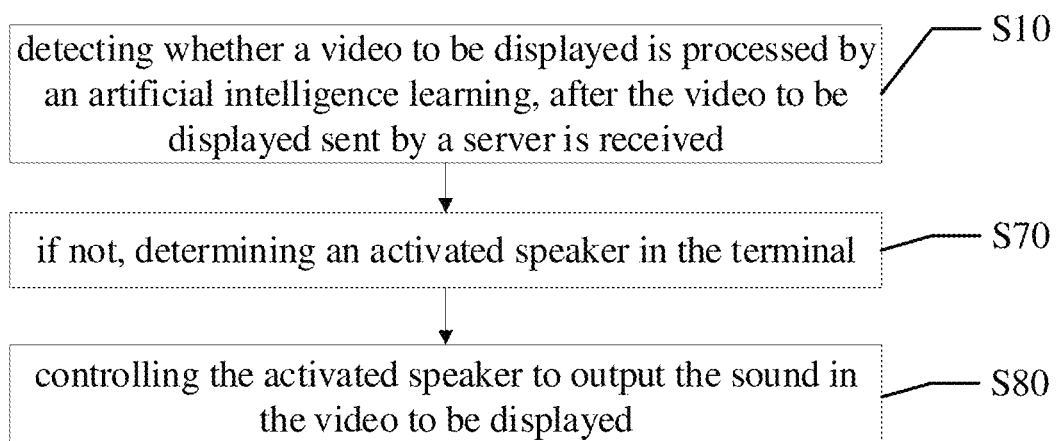
FIG. 8 is a flow chart of a method for controlling a terminal speaker according to another exemplary embodiment of the present disclosure.

The difference between the method for controlling the terminal speaker according to the fourth embodiment and the method for controlling the terminal speaker according to the first or second embodiment includes that, as shown in FIG. 8, the method according to the fourth embodiment further includes:

S70, if not, determining an activated speaker in the terminal; and

S80, controlling the activated speaker to output the sound in the video to be displayed.

When the terminal detects that the video to be displayed is not processed by the artificial intelligence learning, the terminal determines the speaker that is activated, and controls the activated speaker to output the sound in the video to be displayed. Further, when the terminal detects that the video to be displayed is not processed by the artificial intelligence learning, the terminal decodes the video to be displayed for obtaining audio track information in the video to be displayed, and controls the speaker to output the sound in the video to be displayed according to the audio track information. The audio tracks are presented as "tracks" parallel to each other visible in sequencer software. Each audio track defines the property of the audio track, such as the timbre of the audio track, the sound library, the number of channels, the input/output port, and the volume, etc.

In this embodiment, when it is detected that the video to be displayed is not subjected to the artificial intelligence learning, the activated speaker of the terminal is controlled to output the sound in the video to be displayed, so that the video which is not processed by the artificial intelligence learning can also been displayed normally.

In addition, the embodiment of the present disclosure further provides a computer readable storage medium which stores the program for controlling the terminal speaker. The program for controlling the terminal speaker performs, when executed by the processor, the operations of the method for controlling the terminal speaker as described above.

The specific embodiments of the computer readable storage medium of the present disclosure are substantially the same as the embodiments of the method for controlling the terminal speaker, respectively. No need to repeat again.

It needs to be noted that in the present disclosure, the terms "comprising", "including" or other variants aim to cover non-exclusive inclusion, such that the processes, methods, articles or devices including a series of factors not only include these factors, but also include other factors not listed explicitly, or further comprise include intrinsic for such processes, methods, articles or devices. In the absence of more limitations, the factors limited by "comprising a" do not exclude that additional identical factors are also included in the processes, methods, articles or devices comprising said factors.

The sequence number in the above embodiments of the present disclosure is only for the purpose of explanation and not intended to indicate the merits of the embodiments.

Through above description of the embodiments, it should be understood by a person skilled in the art that the present disclosure may be implemented by means of software in connection with necessary universal hardware platform. Of course, the present disclosure may also be implemented by a hardware. However, in many cases the former is more preferred. Based on this understanding, all or the part contributing to the prior art of the technical solution of the present disclosure may be embodied in the form of software. The computer software may be stored in a storage medium (such as ROM/RAM, diskette, or light disk) and include a plurality of instructions which are used to implement the method as described in the various embodiments of the present disclosure by a mobile terminal (such as cell phone, computer, server, air conditioner, or networking devices, etc.).

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure. Therefore, the scope of protection of this disclosure shall be subject to the claims.

What is claimed is:

1. A method for controlling a terminal speaker, wherein a display screen of a terminal is divided into at least two displaying areas, each displaying area corresponding to at least one speaker, and the method comprises the following operations:

detecting whether a video to be displayed is processed by an artificial intelligence learning, after the video to be displayed sent by a server is received;

if yes, acquiring a frame identification code in the video to be displayed;

if a frame currently displayed by the terminal is a target frame corresponding to the frame identification code, determining position information of a target sound source according to the frame identification code corresponding to the target frame; and controlling the at least one speaker in the displaying area corresponding to the position information of the target sound source to output a sound corresponding to the target frame.

2. The method according to claim 1, wherein the operation of controlling the at least one speaker in the displaying area corresponding to the position information of the target sound source to output the sound corresponding to the target frame, comprises:

if it is detected that the position information of the target sound source corresponds to two displaying areas, determining that the position information of target sound source corresponds to a previously appeared displaying area and a subsequently appeared displaying area; and controlling the speaker corresponding to the previously appeared displaying area to output the sound corresponding to the target frame with a decreasing voice volume, and controlling the speaker corresponding to the subsequently appeared displaying area to output the sound corresponding to the target frame with an increasing voice volume.

3. The method according to claim 2, wherein after the operation of if it is detected that the position information of the target sound source corresponds to two displaying areas, determining that the position information of target sound source corresponds to the previously appeared displaying area and the subsequently appeared displaying area, the method further comprises:

controlling the speaker corresponding to the previously appeared displaying area to output the sound corresponding to the target frame with a first volume, and controlling the speaker corresponding to the subsequently appeared displaying area to output the sound corresponding to the target frame with a second volume, wherein the first volume is lower than the second volume.

4. The method according to claim 1, wherein the operation of acquiring the frame identification code in the video to be displayed, if it is detected that the video to be displayed is processed by the artificial intelligence learning, comprises:

acquiring the frame identification code from a header file of the video to be displayed.

5. The method according to claim 1, wherein after the operation of detecting whether the video to be displayed is processed by the artificial intelligence learning, after the video to be displayed sent by the server is received, the method further comprises:

if not, adopting a preset artificial intelligence learning algorithm to identify the position information of a sound source corresponding to a sound frame in the video to be displayed; and adding frame identification codes to the sound frame, associating and writing each of the frame identification codes and corresponding position information of the sound source into the video to be displayed, for obtaining the video to be displayed as processed by the artificial intelligence learning.

6. The method according to claim 5, wherein the operation of associating and writing each of the frame identification codes and corresponding position information of the sound source into the video to be displayed, for obtaining the video to be displayed as processed by the artificial intelligence learning, comprises:

encoding each of the frame identification codes and corresponding position information of sound source as a character string according to a preset coding rule; and adding an ending tag to an end of the character string, and writing the character string carrying the ending tag into the header file of the video to be displayed for obtaining the video to be displayed as processed by the artificial intelligence learning.

7. The method according to claim 1, wherein after the operation of detecting whether the video to be displayed is processed by the artificial intelligence learning, after the video to be displayed sent by the server is received, the method further comprises:

if not, determining an activated speaker in the terminal; and controlling the activated speaker to output the sound in the video to be displayed.

8. The method according to claim 1, wherein the operation of detecting whether the video to be displayed is processed by the artificial intelligence learning, after the video to be displayed sent by the server is received, comprises:

after the video to be displayed sent by the server is received, detecting whether a feature code of the artificial intelligence learning exists in the video to be displayed; and if the feature code exists in the video to be displayed, determining the video to be displayed as processed by the artificial intelligence learning.

9. The method according to claim 2, wherein the operation of detecting whether the video to be displayed is processed by the artificial intelligence learning, after the video to be displayed sent by the server is received, comprises:

after the video to be displayed sent by the server is received, detecting whether a feature code of the artificial intelligence learning exists in the video to be displayed; and if the feature code exists in the video to be displayed, determining the video to be displayed as processed by the artificial intelligence learning.

10. The method according to claim 3, wherein the operation of detecting whether the video to be displayed is processed by the artificial intelligence learning, after the video to be displayed sent by the server is received, comprises:

after the video to be displayed sent by the server is received, detecting whether a feature code of the artificial intelligence learning exists in the video to be displayed; and if the feature code exists in the video to be displayed, determining the video to be displayed as processed by the artificial intelligence learning.

11. The method according to claim 4, wherein the operation of detecting whether the video to be displayed is processed by the artificial intelligence learning, after the video to be displayed sent by the server is received, comprises:

after the video to be displayed sent by the server is received, detecting whether a feature code of the artificial intelligence learning exists in the video to be displayed; and if the feature code exists in the video to be displayed, determining the video to be displayed as processed by the artificial intelligence learning.

12. The method according to claim 5, wherein the operation of detecting whether the video to be displayed is processed by the artificial intelligence learning, after the video to be displayed sent by the server is received, comprises:

after the video to be displayed sent by the server is received, detecting whether a feature code of the artificial intelligence learning exists in the video to be displayed; and if the feature code exists in the video to be displayed, determining the video to be displayed as processed by the artificial intelligence learning.

13. The method according to claim 6, wherein the operation of detecting whether the video to be displayed is processed by the artificial intelligence learning, after the video to be displayed sent by the server is received, comprises:

after the video to be displayed sent by the server is received, detecting whether a feature code of the artificial intelligence learning exists in the video to be displayed; and if the feature code exists in the video to be displayed, determining the video to be displayed as processed by the artificial intelligence learning.

14. A device for controlling a terminal speaker, comprising a memory, a processor, and a program for controlling the terminal speaker stored on the memory and executable on the processor, the program when executed by the processor performing the following operations:

detecting whether a video to be displayed is processed by an artificial intelligence learning, after the video to be displayed sent by a server is received;

if yes, acquiring a frame identification code in the video to be displayed;

if a frame currently displayed by the terminal is a target frame corresponding to the frame identification code, determining position information of a target sound source according to the frame identification code corresponding to the target frame; and controlling the at least one speaker in the displaying area corresponding to the position information of the target sound source to output a sound corresponding to the target frame.

15. A non-transitory computer readable storage medium, wherein the non-transitory computer readable storage medium stores a program executed by a processor for controlling a terminal speaker, the program when executed by the processor performing the following operations:

detecting whether a video to be displayed is processed by an artificial intelligence learning, after the video to be displayed sent by a server is received;

if yes, acquiring a frame identification code in the video to be displayed;

if a frame currently displayed by the terminal is a target frame corresponding to the frame identification code, determining position information of a target sound source according to the frame identification code corresponding to the target frame; and controlling the at least one speaker in the displaying area corresponding to the position information of the target sound source to output a sound corresponding to the target frame.

\* \* \* \* \*